United States Patent

Friebe et al.

[11] Patent Number: 6,001,888
[45] Date of Patent: *Dec. 14, 1999

[54] ACTIVATOR FOR THE DEPOLYMERIZATION OF POLYSILOXANES WHICH ARE CROSSLINKED, OPTIONALLY CONTAIN FILLERS AND/OR ARE UNCROSSLINKED

[75] Inventors: Robert Friebe; Wilhelm Weber; Karl-Heinz Sockel, all of Leverkusen, Germany

[73] Assignee: GE Bayer Siliconesgmbh & Co.KG, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/847,764

[22] Filed: Apr. 22, 1997

Related U.S. Application Data

[63] Continuation of application No. 08/545,082, Oct. 19, 1995, abandoned.

[30] Foreign Application Priority Data

Oct. 26, 1994 [DE] Germany .............................. 44 38 175

[51] Int. Cl.$^6$ ............................ C08J 11/04; C08G 77/04; C09K 15/32
[52] U.S. Cl. ............................ 521/47.5; 528/23; 528/487; 528/933; 252/389.22; 252/389.23; 252/400.22; 252/174.16

[58] Field of Search .......................... 521/47.5; 528/487, 528/933, 23; 252/389.22, 389.23, 400.22, 174.16

[56] References Cited

U.S. PATENT DOCUMENTS

| | | | |
|---|---|---|---|
| 2,673,843 | 3/1954 | Humphrey et al. | 521/47.5 |
| 4,654,041 | 3/1987 | Nickel | 8/137 |

FOREIGN PATENT DOCUMENTS

| | | | |
|---|---|---|---|
| 0199227 | 10/1986 | European Pat. Off. . | |
| 0234994 | 4/1986 | Germany | 521/47.5 |
| 4300168 | 7/1994 | Germany . | |

OTHER PUBLICATIONS

Database WPI, Week 7246, Derwent Publications Ltd., London, GB; AN 72–72662T XP002019970 & DD 92 491 A, 1970 (Tesla Narodni Podnik) *Zusammenfassung*.

Primary Examiner—James J. Seidleck
Assistant Examiner—Olga Asinovsky
Attorney, Agent, or Firm—Sprung Kramer Schaefer & Briscoe

[57] ABSTRACT

The invention relates to activators for the depolymerization of polysiloxanes which are crosslinked, optionally contain fillers and/or are uncrosslinked, a method for the depolymerization of polysiloxanes which are crosslinked, optionally contain fillers and/or are uncrosslinked, and their use.

12 Claims, No Drawings

ACTIVATOR FOR THE DEPOLYMERIZATION OF POLYSILOXANES WHICH ARE CROSSLINKED, OPTIONALLY CONTAIN FILLERS AND/OR ARE UNCROSSLINKED

This application is a continuation, of application Ser. No. 08/545,082, filed on Oct. 19, 1995 which is abandoned.

The invention relates to an activator for the depolymerization of polysiloxanes which are crosslinked, optionally contain fillers and/or are uncrosslinked, a method for the depolymerization of polysiloxanes which are crosslinked, optionally contain fillers and/or are uncrosslinked, and their use.

Silicone products such as, for example, sealants, elastomers, resins or adhesives, have a wide field of application owing to their excellent resistance to environmental influences. Their insolubility, their resistance to attack by chemicals and their thermal stability render them much sought-after materials. However, the insolubility of the network of the silicone sealant, once formed, can also bring about disadvantages. Thus, for example, contaminations by silicone sealants due to unclean application procedures or old sealants have as a rule to be removed mechanically. Frequently a residue of silicone rubber remains on the substrate which in most cases resists attempts to remove it by cleaning.

In DE 43 00 168 it is shown that residues of crosslinked silicone rubber can be removed by means of alkylbenzenesulphonic acids, which are also already employed as catalysts in the preparation of polysiloxanes. The fact these are strong acids which are known to be corrosive and caustic can be a disadvantage in the case of many substrates.

The object of the present invention is therefore to provide an activator for the depolymerization which acts as quickly as possible, is not corrosive and is mild as regards acidic strength.

Surprisingly, it has now been found that phosphoric acid and/or specific esters of phosphoric acid allow the rapid depolymerization of crosslinked or uncrosslinked polysiloxanes.

The present invention therefore relates to an activator for the depolymerization of crosslinked polysiloxanes optionally containing fillers, which activator contains phosphoric acid and/or monoesters and/or diesters of phosphoric acid of the following general formula (I)

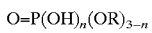

and polycondensation products derived therefrom,
wherein n is 1, 2, or 3 and the radical R is an aromatic radical such as, for example, a phenyl, tolyl or mesityl radical, or is a saturated, unsaturated, straight-chain or branched aliphatic hydrocarbon radical having from 1 to 20 carbon atoms,
and, where n=1, the radicals R are identical or different to one another.

The present invention also relates to activators for the depolymerization of crosslinked and/or uncrosslinked polysiloxanes, which activators contain phosphoric acid and/or monoesters and/or diesters of phosphoric acid of the following general formula (I)

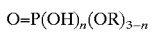

and polycondensation products derived therefrom,
wherein n is 1, 2 or 3 and the radical R denotes aromatic, saturated, unsaturated, straight-chain or branched aliphatic hydrocarbon radicals containing 1 to 20 carbon atoms,
and where n=1 the radicals R can each be identical or different to one another, and at least one additional auxiliary substance.

Crosslinked and/or uncrosslinked polysiloxanes which can be depolymerized for the purpose of the invention are all known linear siloxanes such as, for example, α,ω-dihydroxy-polydimethylsiloxanes, dimethylvinylsiloxy- or trimethylsiloxy-terminated polydimethylsiloxanes, all known silicone resins and all known polysiloxanes crosslinked by addition, condensation, and by radicals, which optionally contain fillers such as, for example, crosslinked silicone sealants.

Examples of the phosphoric esters according to the invention are: dibutyl phosphate, monobutyl phosphate, bis(2-ethylhexyl) phosphate or monoisononyl phosphate. The use of phosphoric acid alone is less preferred, owing to its highly viscous consistency. In one preferred embodiment of the present invention the activator is a monoester and/or diester of phosphoric acid.

The activators can also consist of several monoesters or several diesters.

In another embodiment of the present invention, the activator contains one or more auxiliary substances. The nature and quantity of the auxiliary substances used is determined by whether the activator, depending on the respective application, has to be paste-like, liquid or gelatinous.

Auxiliary substances for the purpose of the invention are, for example, acidic or neutral fillers such as pyrogenic or precipitated silica which is optionally rendered hydrophobic and other rheological auxiliary substances such as, for example, sheet silicates (bentonites), in combination with a solvent.

Many organic solvents are suitable solvents, for example, halocarbons, esters, ethers, saturated, unsaturated, aliphatic and aromatic branched $C_7$–$C_{30}$ hydrocarbons and carboxylic acids. Liquid carboxylic acids are preferred; carboxylic acids having at least 6 carbon atoms, for example, 2-ethylhexanoic acid, are particularly preferred, because the latter accelerate the dissolving process.

Particularly preferred auxiliary substances are—especially in the case of crosslinked and/or uncrosslinked polysiloxanes—mixtures of aliphatic, naphthenic and aromatic hydrocarbons, such as for example crystal oil K 60 or short-chain polysiloxanes of the general formula

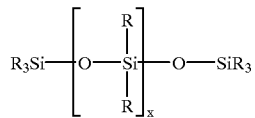

in which R=$C_1$–$C_6$-alkyl or phenyl and preferably methyl, and wherein the radicals within the molecule can be identical or different and x=0 to 20, preferably 0 to 10.

In a preferred embodiment of the present invention, the activator contains monoesters and/or diesters of phosphoric acid and/or phosphoric acid, at least one filler and/or a solvent. In this case it is particularly preferred to use pyrogenic silica as the filler and 2-ethylhexanoic acid as the solvent.

To prepare the activator according to the invention, the phosphoric acid and/or the monoester and/or diester of phosphoric acid are mixed directly with the auxiliary substances optionally present. Optionally the reaction mixture is degassed by brief evacuation after the mixing process is complete.

Paste-like activators can be prepared by adding fillers, for example, pyrogenic or precipitated silica which is optionally rendered hydrophobic, or other rheological auxiliary substances, for example, sheet silicates (bentonites). The phosphate esters according to the invention can be worked directly with the fillers to form paste-like substances, but they can also be dissolved beforehand in one of the above-mentioned solvents. The flow behavior of the pastes which are thickened, for example, using pyrogenic silica, is influenced by the quantity of water introduced together with the silica. From 0.1 to 5% of water can be added for thickening or rendering the mixture firm.

Depending on the application, the activators according to the invention can be prepared in widely varying compositions.

The present invention also relates to a method for the depolymerization of polysiloxanes which are crosslinked, optionally contain fillers and/or are uncrosslinked, whereby the activator according to the invention is brought into contact with the polysiloxanes and at least one auxiliary substance.

The contact time of the polysiloxane with the activator is dependent on the thickness and the degree of cross-linking of the polysiloxane.

In the method according to the invention, the depolymerization can take place over a wide temperature range. The depolymerization of silicones is accelerated by raising the temperature. At room temperature, between 1 and 4 hours is required to dissolve a thin silicone layer. For the depolymerization of crosslinked polysiloxanes which contain basic fillers, a significant excess of the activator must be used because of the neutralization reaction. With thicker layers multiple applications may be used. In the case of silicone sealants, the greater part of the silicone material is generally removed mechanically prior to the application of the remover.

The activator can be used free from auxiliary substances or together with auxiliary substances, as required. The effectiveness is determined primarily by the concentration of phosphoric acid or phosphate ester. The activator mixture contains as a rule at least 5% of phosphate ester. For thickening, preferably between 1 and 25% of pyrogenic silica, particularly preferably from 5 to 15%, is used. The addition of from 0.5 to 2% of water has proved to be particularly advantageous for the preparation of firm phases.

The present invention also relates to the use of the activators according to the invention for the depolymerization of crosslinked and/or uncrosslinked polysiloxanes. In one embodiment of the present invention, the activator according to the invention is used for the depolymerization of crosslinked silicone sealants.

The following non-limiting examples serve to illustrate the invention.

1. DEPOLYMERIZATION OF CROSSLINKED POLYSILOXANES

EXAMPLE 1

34.0 parts by weight of bis(2-ethylhexyl) phosphate are dissolved in 50.5 parts by weight of isoeicosane, a saturated branched hydrocarbon (isoparaffin $C_{20}$ portion greater than 90%), in a mixer. 15.5 parts by weight of a pyrogenic silica (150 $m^2/g$) are then added in three portions with mixing, stirring is continued for 10 minutes and the mixture is degassed at 50 mbar. A transparent paste-like to gelatinous product is obtained.

EXAMPLE 2

10 parts by weight of a pyrogenic silica having a surface area of 150 $m^2/g$ are added in three portions, with mixing, to 90 parts by weight of a mixture of monoisononyl phosphate and diisononyl phosphate in the approximate molar ratio of 1:1. Stirring is then continued for 10 minutes and the mixture is degassed at 50 mbar. The product obtained is a liquid of medium viscosity.

EXAMPLE 3

10.0 parts by weight of a pyrogenic silica are added in three portions, with mixing, to a mixture of 27.0 parts by weight of bis(2-ethylhexyl) phosphate and 63.0 parts by weight of 2-ethylhexanoic acid. The mixture is then stirred for a further 10 minutes. 0.5 parts by weight of water are then admixed and the mixture is degassed at 50 mbar. A paste-like, firm product is obtained.

EXAMPLE 4 (COMPARISON)

The procedure in Example 3 is followed, with the sole difference that 90.0 parts by weight of 2-ethylhexanoic acid are used instead of a mixture of bis(2-ethylhexyl) phosphate and 2-ethylhexanoic acid.

The activators from Examples 1, 2, 3 and 4 are tested as follows:

A transparent silicone sealant which cures with the elimination of acetic acid and is composed of 60.2 parts by weight of OH-terminated polydimethylsiloxane having a viscosity of 50 Pa.s, 25.0 parts by weight of trimethylsiloxy-terminated polydimethylsiloxane having a viscosity of 1 Pa.s, 4.0 parts by weight of ethyltriacetoxysilane, 9.5 parts by weight of pyrogenic silica having a specific surface of 150 $m^2/g$ and 0.01 parts by weight of dibutyltin diacetate was applied to glass plates and cured for one week. The test specimens were 1 cm wide, about 4 cm long and 2 mm thick. The activators from Examples 1 to 4 were applied in a layer thickness of from 1 to 2 mm. After selected contact times tests were carried out by means of a spatula to determine whether the silicone elastomer could be easily removed mechanically.

The experimental results are shown in Table 1 below.

| Example | Test after | | |
|---|---|---|---|
| No. | 3 hours | 6 hours | 24 hours |
| 1 | Approx. 0.5 mm of the silicone sealant was depolymerized | Approx. 1.0–1.5 mm of the silicone sealant was depolymerized | A very thin, very soft later of the silicone sealant remained on the glass plate. |
| 2 | Approx. 0.5 mm of the silicone sealant was depolymerized | Approx. 0.5–1.0 mm of the silicone sealant was depolymerized | An approx. 0.5 mm thick layer of silicone, which was however, already very soft, remained on the glass plate |
| 3 | Approx. 0.5–1.0 mm of the silicone sealant was depolymerized | Approx. 1.0–1.5 mm of the silicone sealant was depolymerized. | The silicone sealant could be completely removed. |
| 4 | The silicone sealant was virtually unaltered. | The silicone sealant was virtually unaltered | The silicone sealant showed no alteration even ater 24 hours. No sign of depolymerization was detected. |

It will be understood that the specification and examples are illustrative but not limitative of the present invention and that other embodiments within the spirit and scope of the invention will suggest themselves to those skilled in the art.

EXAMPLE 5

The same procedure is followed as in Example 1 and a silicone removal paste is prepared from 45 parts by weight of bis-(2-ethylhexyl) phosphate, 45 parts by weight of crystal oil K 60 (a mixture of aliphatic, naphthenic and aromatic hydrocarbons, CAS No. 64742-88-7, obtainable from Grüssing GmbH, Filsum), 9.5 parts by weight of a pyrogenic silica with a specific surface area of 150 m$^2$/g and 0.5 parts by weight of water. The test results are shown in Table 2.

EXAMPLE 6

The same procedure is followed as in Example 5 and a paste is prepared from 42.5 parts by weight of bis-(2-ethylhexyl) phosphate, 42.5 parts by-weight of a short-chain polydimethylsiloxane of an average composition (CH$_3$)$_3$SiO[Si(CH$_3$)$_2$O]$_4$Si(CH$_3$)$_3$ and 15 parts by weight of a paraffin (solidification point 69 to 73° C., obtainable from Merck, Darmstadt). In order to prepare a homogeneous composition it was necessary to heat the mixture to about 100° C. (see Table 2 for the test results).

TABLE 2

| Example no. | testing after about 18 hours[1] |
|---|---|
| 5 | silicone sealant almost completely dissolved |
| 6 | silicone sealant completely dissolved |

[1] These tests were carried out using a transparent vulcanised sealant with a layer thickness of about 2 mm.

EXAMPLE 7

In the following a number of different tests were carried out, except that a silicone removal paste was not prepared and only the depolymerising effect of the composition was determined. For this purpose a mixture of the composition mentioned in Table 3 was initially prepared and then a vulcanised transparent strip of sealant with a thickness of about 2 mm, a length of 25 mm and a width of 5 mm was covered with about 5 ml of the corresponding mixture in a small glass tube with a capacity of about 8 ml and the effect was determined after the indicated time.

These tests serve to demonstrate that catalysts which are known to have a depolymerising effect on silicone polymers are not necessarily suitable for depolymerising vulcanised silicone elastomers. This applies in particular to conditions in which a silicone removal paste would be used in practice, i.e. at room temperature, by applying the paste to the silicone elastomer layers to be removed.

TABLE 3

| Example 7 | composition of the liquid mixture | testing of the sealant after about 18 hours |
|---|---|---|
| a | 100% of bis-(2-ethylhexyl) phosphate | sealant slightly dissolved |
| b | 50% of bis-(2-ethylhexyl) phosphate, 50% of cyclohexane | sealant almost completely dissolved |
| c | 50% of bis-(2-ethylhexyl) phosphate, 50% crystal oil K 60 | sealant almost completely dissolved |
| d | 50% of bis-(2-ethylhexyl) phosphate, 50% of siloxane 1 | sealant almost completely dissolved |

TABLE 3-continued

| Example 7 | composition of the liquid mixture | testing of the sealant after about 18 hours |
|---|---|---|
| e[2] | 100% of siloxane 1 | sealant not affected, slightly swollen |
| f[2] | 100% crystal oil K 60 | sealant not affected, slightly swollen |
| g[2] | 90% siloxane 1, 10% caesium hydroxide | sealant slightly swollen, but not dissolved |
| h | 48% methanol, 50% methyltrimethoxysilane, 2% NaOH | no change in the sealant |
| i | 98% methanol, 2% NaOH | no change in the sealant |
| j | 100% of cyclohexane | sealant slightly swollen, no depolymerisation |

Siloxane 1: short-chain polydimethylsiloxane of the average composition (CH$_3$)$_3$SiO[Si(CH$_3$)$_2$O]$_4$Si(CH$_3$)$_3$
[2] Comparative test As can be seen from Table 3, only the compositions containing the bis-(2-ethylhexyl) phosphate depolymerise the vulcanised silicone elastomers under these conditions. It can also be seen that the depolymerising effect is enhanced by the addition of solvents such as for example cyclohexane.

2. DEPOLYMERIZATION OF UNCROSSLINKED POLYSILOXANES

The tests mentioned below are intended to demonstrate the depolymerising effect of phosphoric acid esters and sodium hydroxide, which is a known catalyst for the depolymerisation of silicone polymers (e.g. DE OS 40 22 661). The tests were carried out with a dimethylvinylsiloxy-terminated polydimethylsiloxane of a viscosity of about 65 Pa.s at 25° C. (obtainable from Bayer AG under the name Silopreng® U 65). The depolymerising effect was determined by measuring the viscosity of the corresponding catalyst/silicone polymer mixture over the course of time. The decrease in viscosity is a clear indication of a depolymerising effect of the corresponding catalyst. The viscosity measurements were carried out with a rotation viscosimeter from Haake, although only the relative change in viscosity was determined and specified in scale divisions. The corresponding results are contained in Table 4.

TABLE 4

| Example | composition of the mixture | time (in minutes) | viscosity (scale divisions) |
|---|---|---|---|
| 8 | 98% Silopren ® U65, 2% bis-(2-ethylhexyl) phosphate | 2 | 27.0 |
| | | 7 | 27.5 |
| | | 17 | 19.5 |
| | | 52 | 12.5 |
| | | 81 | 11.5 |
| | | 184 | 11.0 |
| 9 | 96% Silopren ® U65, 2% bis-(2-ethylhexyl) phophate, 2% cyclohexane | 3 | 20.5 |
| | | 28 | 17.5 |
| | | 34 | 11.0 |
| | | 104 | 7.0 |
| 10 | 96% Silopren ® U65, 2% bis-(2-ethylhexyl) phosphate, 2% ethylhexanoic acid | 7 | 21.5 |
| | | 22 | 17.5 |
| | | 61 | 11.0 |
| | | 77 | 9.0 |
| 11 | 98% Silopren ® U65, 2% mixture 1 | 0 | 30.0 |
| | | 60 | 28.5 |
| | | 280 | 24.5 |
| | | 1260 | 12.0 |

TABLE 4-continued

| Example | composition of the mixture | time (in minutes) | viscosity (scale divisions) |
|---|---|---|---|
| 12 | 98% Silopren ® U65, 2% mixture 2 | 0 | 28.0 |
| | | 60 | 20.0 |
| | | 280 | 7.0 |
| | | 1260 | 0.5 |

Mixture 1: 98% of methanol, 2% of NaOH
Mixture 2: 48% methanol, 48% methyltrimethoxysilane, 2% NaOH As the test results show both the phosphoric acid ester used and sodium hydroxide depolymerise the silicone polymer. It is clear from the changes in relative viscosity that bis-(2-ethylhexyl) phosphate causes a grater decrease in viscosity after shorter times and a combination with the auxiliary substances according to the invention such as cyclohexane and 2-ethylhexanoic acid greatly increases the depolymerising effect on the silicone polymer compared to bis-(2-ethylhexyl) phosphate by itself (examples 8 to 10).

We claim:

1. Activator for the depolymerization of crosslinked polysiloxanes, uncrosslinked polysiloxanes, or combinations thereof comprising one or more monoesters of phosphoric acid, one or more diesters of phosphoric acid, or both, of the following general formula (I)

$$O=P(OH)_n(OR)_{3-n}$$

wherein n is 1 or 2 and the radical R denotes aromatic, saturated, unsaturated, straight-chain or branched aliphatic hydrocarbon radicals containing 1 to 20 carbon atoms, and where n=1 the radicals R can be identical to or different than one another, in an organic solvent, optionally comprising 0.1 to 5% wt. water.

2. The activator of claim 1, further comprising a filler.

3. The activator of claim 2, wherein said filler is present in an amount of 1 to 25% by weight.

4. The activator of claim 1, further comprising an auxiliary substance selected from the group consisting of 2-ethylhexanoic acid, a mixture of aliphatic, naphthenic and aromatic hydrocarbons, short-chain polysiloxanes of the general formula $R_3Si$—$[OSi(R)_2]_x$—$OSiR_3$, in which $R=C_1$–$C_6$-alkyl or phenyl and the radicals within the molecule can be identical or different and x=0 to 20 and combinations of said aliphatic, naphthenic and aromatic hydrocarbons and said polysiloxanes.

5. The activator of claim 4, wherein said auxiliary substance is present in an amount of from 10% to 73% by weight.

6. The activator of claim 1, wherein said organic solvent is selected from the group consisting of halocarbons, esters, ethers, saturated, unsaturated, aliphatic, naphthenic and aromatic branched $C_7$–$C_{30}$ hydrocarbons and carboxylic acids.

7. Activator for the depolymerization of crosslinked polysiloxanes, uncrosslinked polysiloxanes, or combinations thereof comprising one or more monoesters of phosphoric acid, one or more diesters of phosphoric acid, or both, of the following general formula (I)

$$O=P(OH)_n(OR)_{3-n}$$

wherein n is 1 or 2 and the radical R denotes aromatic, saturated, unsaturated, straight-chain or branched aliphatic hydrocarbon radicals containing 1 to 20 carbon atoms, and where when n=1 the radicals R can be identical to or different than one another, in a polydimethylsiloxane, optionally comprising 0.1 to 5% water.

8. The activator of claim 7, further comprising a filler.

9. The activator of claim 8, wherein said filler is present in an amount of 1 to 25% by weight.

10. The activator of claim 7, further comprising an auxiliary substance selected from the group consisting of 2-ethylhexanoic acid, a mixture of aliphatic, naphthenic and aromatic hydrocarbons, short-chain polysiloxanes of the general formula $R_3Si$—$[OSi(R)_2]_x$—$OSiR_3$, in which $R=C_1$–$C_6$-alkyl or phenyl and the radicals within the molecule can be identical or different and x=0 to 20 and combinations of said aliphatic, naphthenic and aromatic hydrocarbons and said polysiloxanes.

11. The activator of claim 10, wherein said auxiliary substance is present in an amount of from 10% to 73% by weight.

12. Method for depolymerizing crosslinked or uncrosslinked polysiloxanes, which comprises applying to said polysiloxane one or more monoesters of phosphoric acid, one or more diesters of phosphoric acid, or both, of the formula $$O=P(OH)_n(OR)_{3-n}$$

wherein n is 1 or 2 and the radical R denotes aromatic, saturated, unsaturated, straight-chain or branched aliphatic hydrocarbon radicals having 1 to 20 carbon atoms, and wherein when n=1 the radicals R can be identical to or different than each other, in the absence of a solvent, in an organic solvent, in a polydimethylsiloxane solvent or in a mixture of a polydimethylsiloxane and an organic solvent.

* * * * *